US008365176B2

(12) United States Patent
Campbell et al.

(10) Patent No.: US 8,365,176 B2
(45) Date of Patent: Jan. 29, 2013

(54) DATA CENTER JOB MIGRATION AND SCHEDULING BASED ON SERVER CHASSIS FAN SPEED THRESHOLD

(75) Inventors: Keith M. Campbell, Raleigh, NC (US); Jeffery M Franke, Raleigh, NC (US); John K Whetzel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/579,845

(22) Filed: Oct. 15, 2009

(65) Prior Publication Data

US 2011/0093856 A1 Apr. 21, 2011

(51) Int. Cl.
*G06F 9/50* (2006.01)
*G06F 1/32* (2006.01)
*G05D 23/00* (2006.01)

(52) U.S. Cl. ......... 718/102; 718/105; 713/320; 700/300
(58) Field of Classification Search .................. None
See application file for complete search history.

(56) References Cited

U.S. PATENT DOCUMENTS

| | | | |
|---|---|---|---|
| 6,964,539 B2 | 11/2005 | Bradley et al. | |
| 7,080,263 B2 | 7/2006 | Barr et al. | |
| 7,086,058 B2 | 8/2006 | Luick | |
| 8,171,325 B2 * | 5/2012 | Brillhart et al. | 713/324 |
| 2007/0260895 A1 | 11/2007 | Aguilar, Jr. et al. | |
| 2009/0077558 A1 | 3/2009 | Arakawa et al. | |
| 2009/0187782 A1 * | 7/2009 | Greene et al. | 713/340 |
| 2009/0204830 A1 * | 8/2009 | Frid et al. | 713/322 |
| 2009/0265568 A1 * | 10/2009 | Jackson | 713/320 |
| 2010/0023787 A1 * | 1/2010 | Ho et al. | 713/320 |
| 2010/0136895 A1 * | 6/2010 | Sgro | 454/184 |
| 2010/0194321 A1 * | 8/2010 | Artman et al. | 318/454 |
| 2010/0217454 A1 * | 8/2010 | Spiers et al. | 700/300 |

OTHER PUBLICATIONS

Tang et al., Thermal-Aware Task Scheduling to Minimize Energy Usage of Blade Server Based Datacenters.*
Coskun et al., Temperature Aware Task Scheduling in MPSoCs.*
Moore et al., Making Scheduling "Cool": Temperature-Aware Workload Placement in Data Centers.*
Tang et al., Thermal-Aware Task Scheduling to Minimize Energy Usage of Blade Server Based Datacenters (2006).*
Coskun et al., Temperature Aware Task Scheduling in MPSoCs (2007).*
Moore et al., Making Scheduling "Cool": Temperature-Aware Workload Placement in Data Centers (2005).*

(Continued)

*Primary Examiner* — Jennifer To
*Assistant Examiner* — Benjamin Wu
(74) *Attorney, Agent, or Firm* — H. Barrett Spraggins; Cynthia G. Seal; Biggers & Ohanian, LLP (57) ABSTRACT

Thermal-based job scheduling among server chassis of a data center including identifying, by a data center management module in dependence upon a threshold fan speed for each server chassis, a plurality of server chassis having servers upon which one or more compute intensive jobs are executing, the data center management module comprising a module of automated computing machinery; identifying, by the data center management module, the compute intensive jobs currently executing on the identified plurality of server chassis; and moving, by the data center management module, the execution of the compute intensive jobs to one or more servers of chassis for compute intensive jobs.

14 Claims, 5 Drawing Sheets

OTHER PUBLICATIONS

IBM; Scheduling of Tasks for Thermal Characteristics Through Striping; IP.com Prior Art Database, Technical Disclosure; Feb. 19, 2009; p. 1; US.

Zhou, et al.; Thermal Management for 3D Processors via Task Scheduling; 37th International Conference on Parallel Processing; 2008; pp. 115-122; University of Pittsburgh, Pittsburgh PA.

Buttu, et al.; Thermal Balancing Policy for Streaming Computing on Multiprocessor Architectures; 2008.

Tang, et al.; Thermal-Aware Task Placement in Data Centers; Arizona State University, (2007).

\* cited by examiner

DATA CENTER JOB MIGRATION AND SCHEDULING BASED ON SERVER CHASSIS FAN SPEED THRESHOLD

BACKGROUND OF THE INVENTION

1. Field of the Invention

The field of the invention is data processing, or, more specifically, methods, apparatus, and products for thermal-based job scheduling among server chassis of a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in the administration of numbers of blade servers in blade environments in data centers. A typical blade environment may include a dozen or so blade servers or other types of computers in the blade form factor, while a data center taken as a whole may include hundreds or thousands of blade servers. As the number of blade servers in a blade environment increases their consumption of power also increases. Furthermore, intensive tasks running on a blade server cause the blade server to increase in temperature and therefore requires turning on a fan in the chassis of the blade environment or increasing the fan speed of an already active fan. The fans on such blade environments typically use large amounts of power to pull air through the chassis blades. When a blade in the chassis demands more air due to a job that requires heavy computing resources, the fan speed of active fans will increase, increasing the power draw of the chassis.

SUMMARY OF THE INVENTION

Thermal-based job scheduling among chassis of a data center including identifying, by a data center management module in dependence upon a threshold fan speed for each server chassis, a plurality of server chassis having servers upon which one or more compute intensive jobs are executing, the data center management module comprising a module of automated computing machinery; identifying, by the data center management module, the compute intensive jobs currently executing on the identified plurality of server chassis; and moving, by the data center management module, the execution of the compute intensive jobs to one or more servers of chassis for compute intensive jobs.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
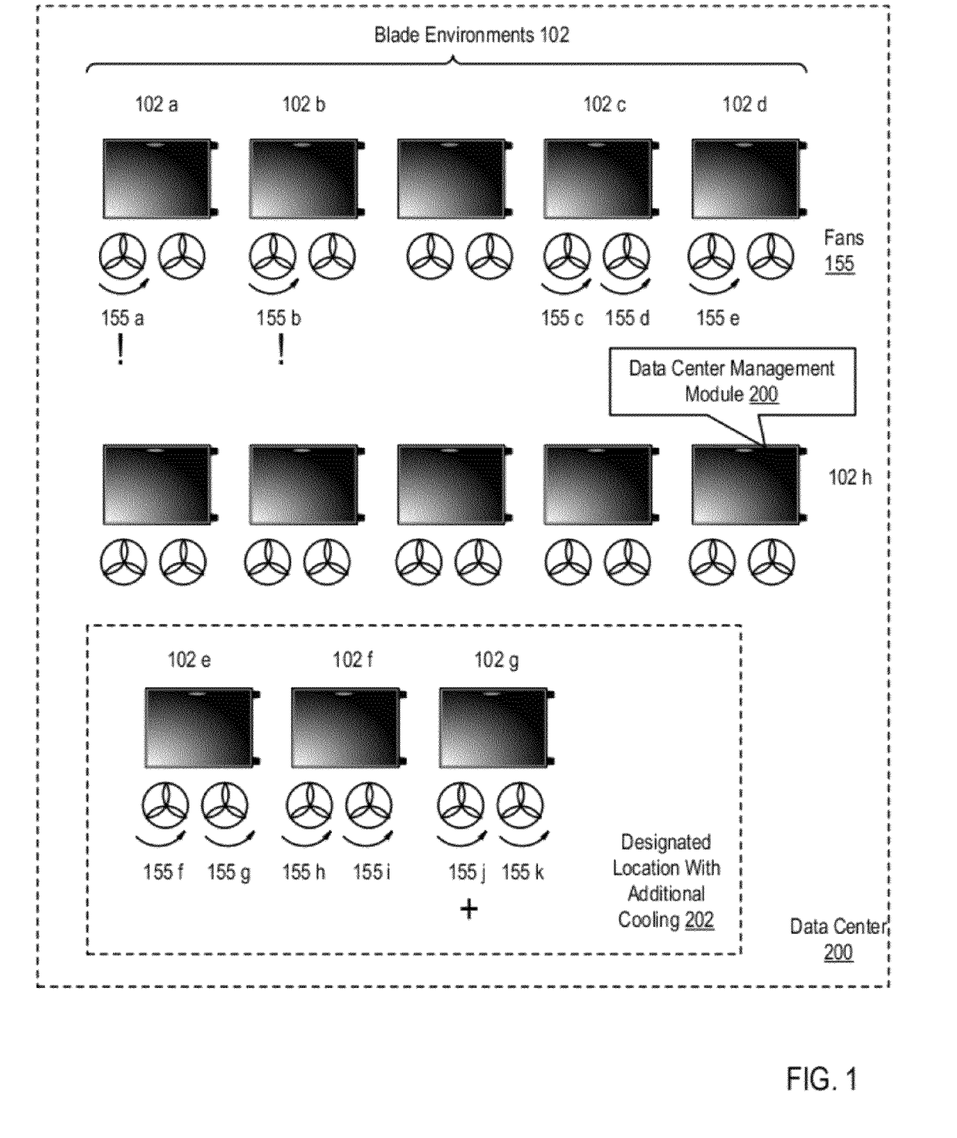
FIG. 1 sets forth a block diagram of a system for thermal-based job scheduling among server chassis of a data center according to embodiments of the present invention.

Exemplary methods, apparatus, and products for thermal-based job scheduling among server chassis of a data center in accordance with the present invention are described with reference to the accompanying drawings, beginning with FIG. 1. FIG. 1 sets forth a block diagram of a system for thermal-based job scheduling among server chassis of a data center according to embodiments of the present invention. The system of FIG. 1 includes a data center (200). A data center is a facility used to house computer systems and associated components, such as telecommunications and storage systems. Data centers generally include redundant or backup power supplies, redundant data communications connections, environmental controls such as air conditioning and security devices and other computers and components as will occur to those of skill in the art.

The data center (200) of FIG. 1 includes a plurality of blade environments (102). 'Blade environment,' as the term is used in this specification, refers generally to a blade server system installed in a chassis and including a number of blade servers, one or more blade management modules, a media tray, a blade server system power supply, and other components. One example of a blade environment useful in thermal-based job scheduling among server chassis of a data center according to embodiments of the present invention is the BladeCenter available from IBM®.

Each of the blade environments (102) of FIG. 1 include two fans for cooling the blade servers housed in the blade environment. Some of the fans in the example of FIG. 1 are actively cooling the blades—that is, spinning—and other fans in the example of FIG. 1 are idle—that is, not spinning Furthermore, each of the active fans that are actively cooling may be spinning at different fan speeds. Blade environment (102a) has one active fan (155a), blade environment (102b) has one active fan (155b), blade environment (102c) has two active fans (155c and 155d), blade environment (102d) has one active fan (155e), blade environment (102e) has two active fans (155f and 155g), blade environment (102f) has two active fans (155j and 155i), and blade environment (102g) has two active fans (155j and 155k).

The management modules of each of the blade environments monitor the fan speeds of the fans housed within the chassis. Such monitoring of the fan speeds may include determining whether one or more of the fans of a blade center chassis in a blade environment are active at all and also determining a speed of rotation of the blades of each active fan, a fan speed.

Active fans consume power resources of the data center and such power consumption is increased as the speeds of the active fans are increased for needed cooling of the blade environments. Typically, such fans are active and have the highest fan speed when the blade servers they are cooling are executing compute intensive jobs. In an effort to reduce power, it is advantageous to have compute intensive jobs consolidated on blade servers with already active fans such that the number of overall active fans in the data center and the relative speeds of those active fans is reduced.

The data center (200) of FIG. 1 also includes a data center management module (200), in this example depicted as running on blade environment (102h). Although the data center management module (200), in this example is depicted as operating on one of the blade environments of the data center, this is for ease of explanation and not for limitation. In fact, such a data center management module (200) may operate on any computer available to the data center as will occur to those of skill in the art.

The data center management module (200) of FIG. 1 is capable of thermal-based job scheduling among server chassis of a data center according to embodiments of the present invention. The data center management module (200) of FIG. 1 identifies, in dependence upon a threshold fan speed for each blade server chassis, a plurality of blade server chassis having blade servers upon which compute intensive jobs are executing, the data center management module comprising a module of automated computing machinery. In the example of FIG. 1, the data center management module (200) identifies fans (155a and 155b) as exceeding a threshold fan speed for the chassis of blade environments (102a and 102b). For ease of explanation, the fans exceeding their threshold fan speed are designated with the symbol '!'.

The data center management module (200) of FIG. 1 identifies compute intensive jobs currently executing on the identified plurality of blade server chassis of the blade environments of (102a and 102b) and moves the execution of the compute intensive jobs to one or more blade servers of chassis for compute intensive jobs. In the example of FIG. 1, data center management module (200) moves the compute intensive jobs executing the servers of blade environment (102a) cooled by fan (155a) and blade environment (102b) cooled by fan (155b) to the servers of blade environment (102g) cooled by already active fan (155j). In the example, of FIG. 1, the data center management module (200) moves the compute intensive jobs to a chassis predetermined as designated for compute intensive jobs in a designated location (202) in the data center (200). Such a designated location (202) may include additional air conditioning or other cooling mechanism designed to support cooling the servers supporting compute intensive jobs.

In the example of FIG. 1, the chassis of blade environment (102g) upon which the execution of compute intensive jobs are moved are different chassis than the plurality of blade server chassis of blade environments (102) and (102b) having blade servers upon which the one or more compute intensive jobs are identified. In alternative embodiments of the present invention, however, the chassis upon which the execution of compute intensive jobs are moved may be a subset of the plurality of blade server chassis having blade servers upon which the one or more compute intensive jobs are identified. Using FIG. 1 as an example, the compute intensive jobs identified on the servers of blade environment (102a) cooled by fan (155a) could be, in an alternative embodiment, moved to the servers of blade environment (102b) cooled by (155b) to reduce the overall demand on fans (155a and 155b) by consolidating the cooling requirements to only fan (155b).

Thermal-based job scheduling among server chassis of a data center consolidates the compute-intensive jobs and allows servers sharing a cooling infrastructure to all benefit from the increase in fan speed (thermal-wise) even if the increase was caused only by a single server. Once the power cost of raising the fan speed has been incurrent, it is more efficient to cool blades supporting more compute intensive jobs with those fans rather than having such compute intensive jobs scattered across a data center being cooled by other fans that could otherwise be idle or operate at lower fan speeds.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Exemplary methods, apparatuses, and products for thermal-based job scheduling among server chassis of a data center are described with referent to blade environments. For further explanation, FIG. 2 sets forth a block diagram of an exemplary blade environment (102) useful in thermal-based job scheduling among server chassis of a data center according to embodiments of the present invention. In this example, the blade environment includes a two-bay chassis (104, 106), a number of blade servers (124), one or more blade management modules (152), a media tray (122), fans (155) and a blade server system power supply (132).

Figure 2:
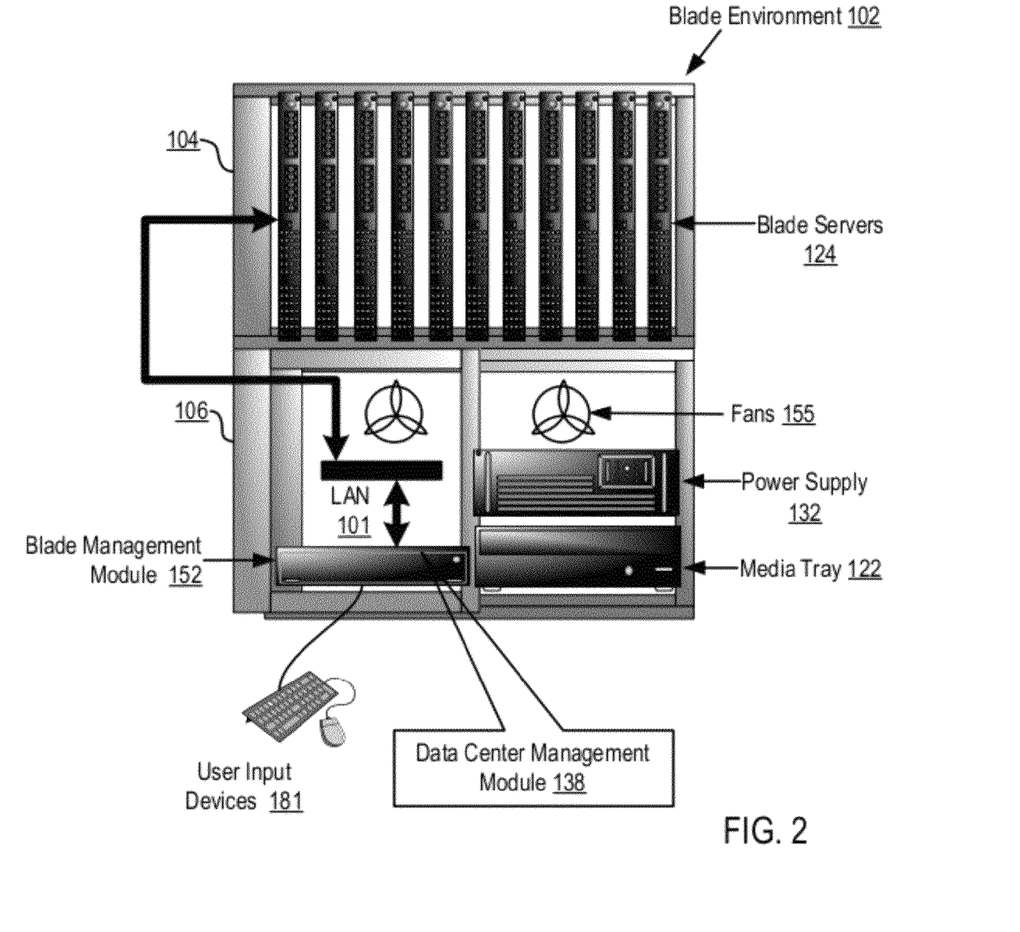
FIG. 2 sets forth a block diagram of an exemplary blade environment useful in thermal-based job scheduling among server chassis of a data center according to embodiments of the present invention.

The blade management module (152) is a small computer in its own right, including software and hardware components, one or more computer processors and computer memory, that provides system management functions for all components in the example blade environment (102) including the blade servers (124) and the media tray (122). The blade management module of FIG. 1 also makes available connections for user input devices such as mice or keyboards (181) that are not generally connected directly to the blade servers or to the blade environment chassis. The blade servers themselves (124), installed in cabinet bay (104) of the exemplary blade environment (102) in the example of FIG. 1, are several computing devices implemented in blade form factor. The blade servers share access to the media tray (122). The blade servers (124) are connected to one another and to the blade management module (152) for data communications through a local area network ('LAN') (101). The LAN (101) is a small network installed within the chassis of the blade environment.

The media tray (122) houses non-volatile memory media generally. A media tray may typically include Compact Disc read-only media drives ('CD-ROM'), Digital Video Disc ROM drives (DVD-ROM), CD-RW drives, DVD-RW drives, floppy disk drives, and so on as will occur those of skill in the art.

Each of the blade servers (124) is cooled by one of the two fans (155) in the example of FIG. 2. The depiction of two fans in the example of FIG. 1 is for explanation and not for limitation. In fact, blade environments useful in thermal-based job scheduling among server chassis of a data center may include any number of fans as will occur to those of skill in the art.

In the example of FIG. 2, the blade management module (152) has installed upon it a data center management module (138), a module of automated computing machinery capable of thermal-based job scheduling among server chassis of a data center according to embodiments of the present invention. The data center management module includes computer program instructions for identifying, in dependence upon a threshold fan speed for each blade server chassis, a plurality of blade server chassis having blade servers upon which one or more compute intensive jobs are executing, the data center management module comprising a module of automated computing machinery; identifying the compute intensive jobs currently executing on the identified plurality of blade server chassis; and moving the execution of the compute intensive jobs to one or more blade servers of chassis for compute intensive jobs.

The arrangement of the blade environment (102), network (101), and other devices making up the exemplary system illustrated in FIG. 2 are for explanation, not for limitation. Data processing systems useful according to various embodiments of the present invention may include additional servers, routers, and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
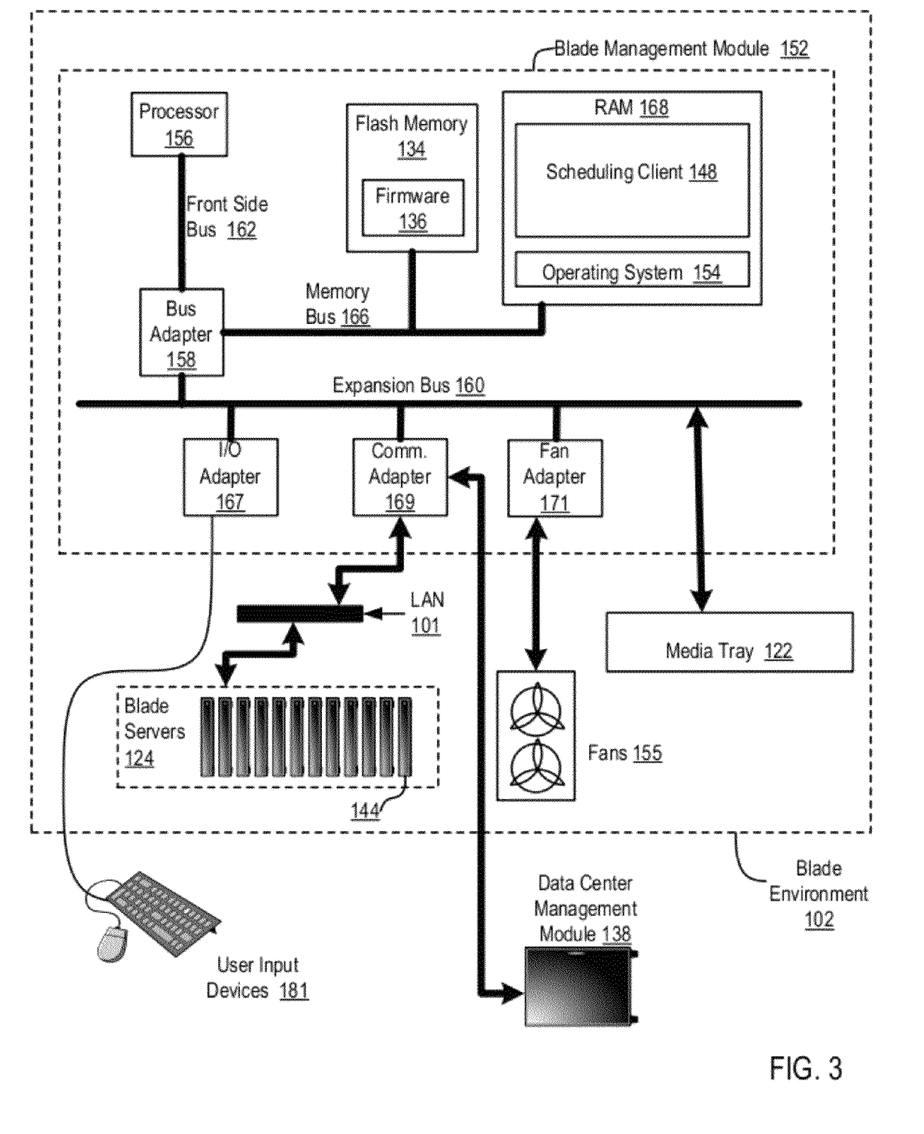
FIG. 3 sets forth a diagram of a further example data processing system useful in thermal-based job scheduling among server chassis of a data center according to embodiments of the present invention.

For further explanation, FIG. 3 sets forth a diagram of a further example data processing system useful in thermal-based job scheduling among server chassis of a data center according to embodiments of the present invention. The example data processing system of FIG. 3 is similar to the example of FIG. 2, including as it does a blade environment (102), blade servers (124) connected through an internal LAN (101) to a blade management module (152), fans (155), a media tray (122) connected to the blade management module. In addition, however, by contrast with FIG. 2, FIG. 3 also includes a functional block diagram showing more detail of the blade management module (152). The blade management module (152) of FIG. 1 includes at least one computer processor (156) or 'CPU' as well as random access memory (168) ('RAM') which is connected through a high speed memory bus (166) and bus adapter (158) to processor (156) and to other components of the blade management module (152).

Stored in RAM in this example is a scheduling client (148), a module of automated computing machinery capable of monitoring the fan speed of each of the fans (155) and reporting that fan speed to a data center management module (138) of the data center for thermal-based job scheduling among server chassis of a data center according to embodiments of the present invention. The scheduling client (148) of FIG. 3 is also capable of identifying compute intensive jobs executing on servers (124) cooled by one or more of the fans (155) and identifying those compute intensive jobs to a data center management module (138) for thermal-based job scheduling among server chassis of a data center according to embodiments of the present invention.

Also stored in RAM (168) is an operating system (154). Operating systems useful for thermal-based job scheduling among server chassis of a data center according to embodiments of the present invention include UNIX™, Linux™, Microsoft Windows XP™, Microsoft Vista™, AIX™, IBM's i5/OS™, and others as will occur to those of skill in the art. The operating system (154) and the power restoration module (138) in the example of FIG. 3 are shown in RAM (168), but many components of such software typically are stored in non-volatile memory also, such as, for example, on a disk drive or in firmware (136) on an EEPROM drive, here shown as flash memory (134).

The exemplary blade management module (152) of FIG. 3 includes one or more input/output ('I/O') adapters (167). I/O adapters implement user-oriented input/output through, for example, software drivers and computer hardware for controlling output to display devices such as computer display screens, as well as user input from user input devices (181) such as keyboards and mice.

The exemplary blade management module (152) of FIG. 3 also includes a communications adapter (169) that couples the blade management module (152) internally within the blade environment (102) for data communications with blade servers (124) through a local area network (101) and externally to the data center management module (200). The networks (101) may be implemented, for example, as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Such a communications adapter (169) are electronic modules that implement the hardware level of data communications through which one computer sends data communications to another computer through a data communications network.

Examples of communications adapters useful according to embodiments of the present invention include modems for wired dial-up communications, Ethernet (IEEE 802.3) adapters for wired data communications network communications, and 802.11 adapters for wireless data communications network communications.

The arrangement of the blade management module (152), the blade servers (124), and other devices making up the exemplary system illustrated in FIG. 3 are for explanation, not for limitation. Data processing systems useful according to various embodiments of the present invention for power restoration to blade servers may include additional servers, routers, and other devices, not shown in FIG. 3, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 3.

Figure 4:
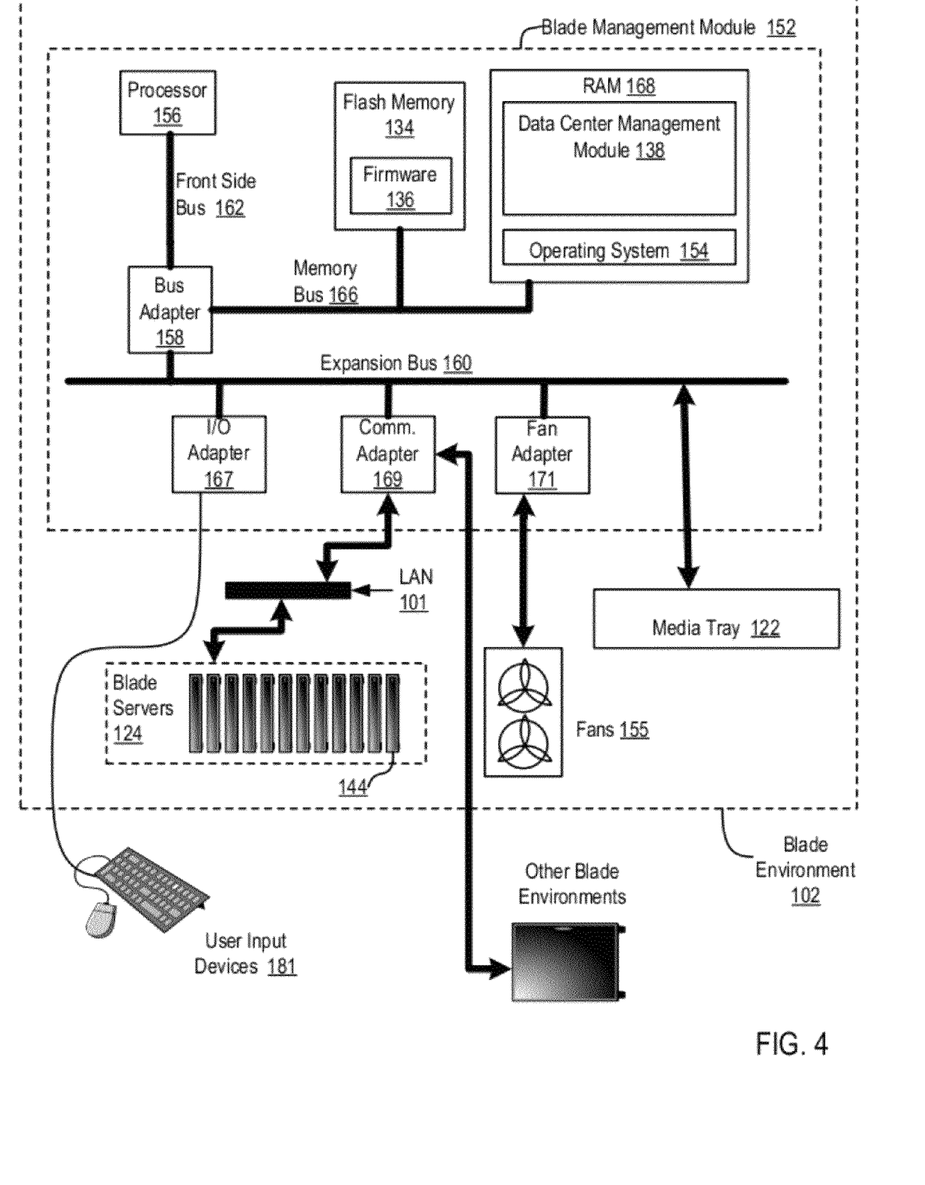
FIG. 4 sets forth a diagram of a further example data processing system useful in thermal-based job scheduling among server chassis of a data center according to embodiments of the present invention.

For further explanation, FIG. 4 sets forth a diagram of a further example data processing system useful in thermal-based job scheduling among server chassis of a data center according to embodiments of the present invention. The example data processing system of FIG. 4 is similar to the example of FIGS. 2 and 3, including as it does a blade environment (102), blade servers (124) connected through an internal LAN (101) to a blade management module (152), fans (155), a media tray (122) connected to the blade management module. Stored in RAM, however, in this example is a data center management module (138), a module of automated computing machinery capable of thermal-based job scheduling among server chassis of a data center according to embodiments of the present invention. The data center management module (138) of FIG. 4 includes computer program instructions for identifying, in dependence upon a threshold fan speed for each blade server chassis, a plurality of blade server chassis having blade servers upon which one or more compute intensive jobs are executing, the data center management module comprising a module of automated computing machinery; identifying the compute intensive jobs currently executing on the identified plurality of blade server chassis; and moving the execution of the compute intensive jobs to one or more blade servers of chassis for compute intensive jobs.

In some embodiments of the present invention, the computer program instructions for moving the execution of the compute intensive jobs to one or more blade servers of chassis for compute intensive jobs include computer program instructions for moving the compute intensive jobs to a chassis predetermined as designated for compute intensive jobs including selecting (312) a chassis in a designated location in the data center. In some embodiments of the present invention, the chassis upon which the execution of compute intensive jobs are moved are different chassis than the plurality of blade server chassis having blade servers upon which the one or more compute intensive jobs are identified, while in others the chassis upon which the execution of compute intensive jobs are moved are a subset of the plurality of blade server chassis having blade servers upon which the one or more compute intensive jobs are identified.

The arrangement of the data center management module, the blade servers, and other devices making up the exemplary system illustrated in FIG. 4 are for explanation, not for limitation. Data processing systems useful according to various embodiments of the present invention for power restoration to blade servers may include additional servers, routers, and other devices, not shown in FIG. 4, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
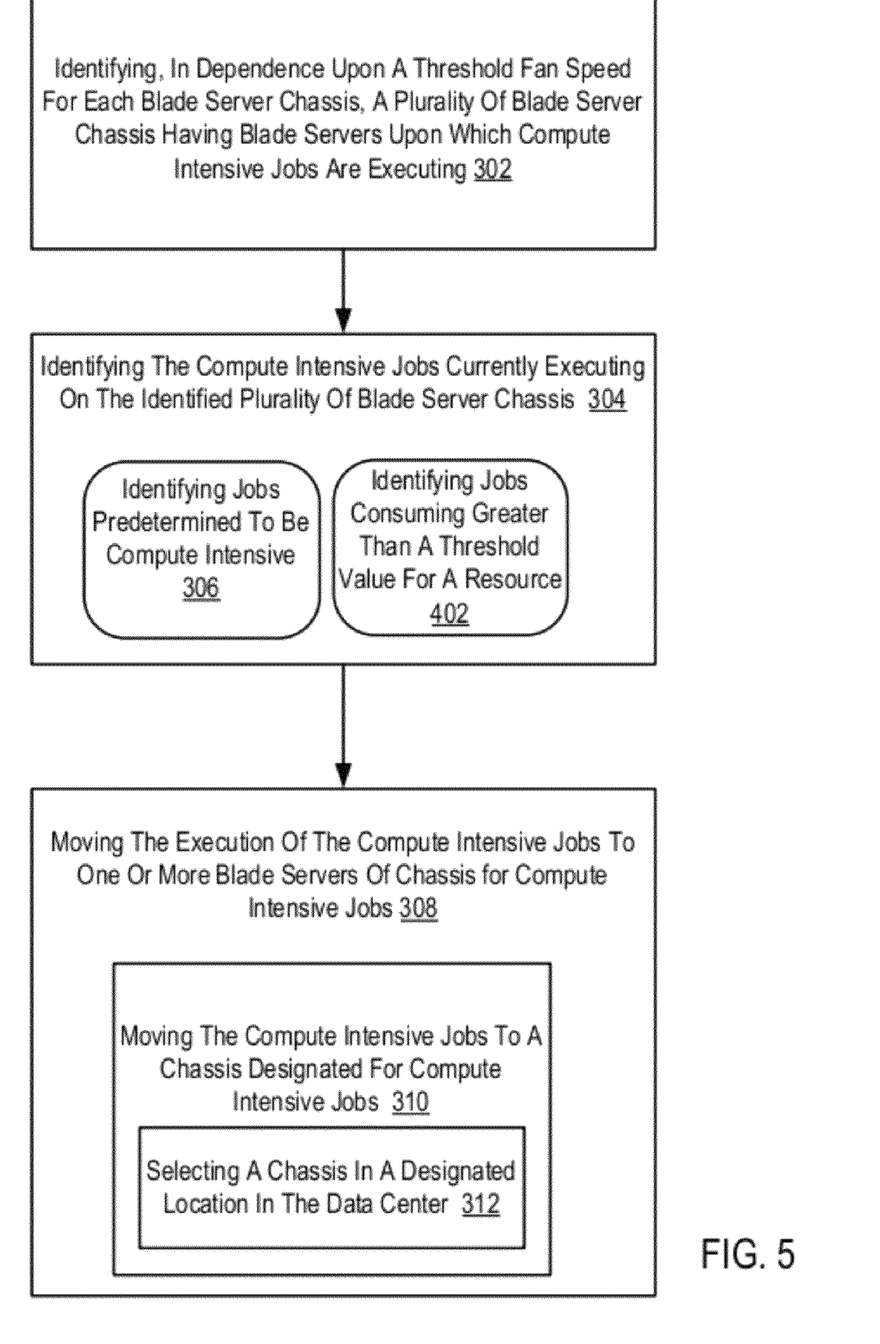
FIG. 5 sets forth a flow chart illustrating an exemplary method of method of thermal-based job scheduling among server chassis of a data center according to embodiments of the present invention.

For further explanation, FIG. 5 sets forth a flow chart illustrating an exemplary method of method of thermal-based job scheduling among server chassis of a data center according to embodiments of the present invention. The method of FIG. 5 includes identifying (302), by a data center management module in dependence upon a threshold fan speed for each blade server chassis, a plurality of blade server chassis having blade servers upon which compute intensive jobs are executing. Identifying (302), by a data center management module in dependence upon a threshold fan speed for each blade server chassis, a plurality of blade server chassis having blade servers upon which compute intensive jobs are executing may be carried out by identifying any chassis with a fan having a fan speed greater than a predetermined value for that fan. A threshold fan speed for identifying blade chassis currently supporting compute intensive jobs may vary according to the power consumption requirements of a data center, the types of jobs being executed in the data center and many others as will occur to those of skill in the art. A threshold fan speed may include the lowest active fan speed for a fan—'the on state'—or may be a value set at any incremental increase in fan speed.

Identifying (302), by a data center management module in dependence upon a threshold fan speed for each blade server chassis, a plurality of blade server chassis having blade servers upon which compute intensive jobs are executing may be carried out by receiving from each blade management module of each blade environment in the data center a fan status for each fan in each blade environment and comparing the status of each fan with a threshold fan speed for that fan. Such a fan status may include the current state of each fan such as idle, active, current speed of active fan and so on. In some embodiments, a data center management module may periodically query each blade management module for the current state of its fans. In alternative embodiments, the blade management module may report to the data center management module any changes in fan state with a new fan status.

The method of FIG. 5 includes identifying (304), by the data center management module, the compute intensive jobs currently executing on the identified plurality of blade server chassis. The example of FIG. 5 includes two alternative methods of identifying (304) a plurality of compute intensive jobs. In one embodiment of the present invention according to the example of FIG. 5, identifying (304) a plurality of compute intensive jobs includes identifying (306) jobs predetermined to be compute intensive. Identifying (306) jobs predetermined to be compute intensive may include receiving a list of current jobs from a blade management module of a chassis having blade servers upon which compute intensive jobs are being executing and comparing the list with jobs previously determined to be compute intensive for a match.

In another embodiment of the present invention, identifying (304) a plurality of compute intensive jobs may be carried out by comprises identifying (402) jobs consuming greater than a threshold value for a resource. Such a resource may include for example, CPU usage, memory consumption, and so on as will occur to those of skill in the art. Identifying (402) jobs consuming greater than a threshold value for a resource may be carried out by receiving a list of current jobs from a blade management module of a chassis having blade servers upon which compute intensive jobs are being executing and receiving the current consumption of resources for each of those jobs and determining one or more job that are consuming the most resources.

The method of FIG. 5 includes moving (308), by the data center management module, the execution of the compute intensive jobs to one or more blade servers of chassis for compute intensive jobs. Moving (308), by the data center management module, the execution of the compute intensive jobs to one or more blade servers of chassis for compute intensive jobs includes ceasing the execution of the compute intensive job on the blade server of the identified chassis and re-starting the execution of the compute intensive job on a blade server of the chassis for compute intensive jobs. As mentioned above, the chassis upon which the execution of compute intensive jobs are moved may be a different chassis than any of the chassis housing blade servers upon which the compute intensive jobs are identified. That is, chassis may be dedicated for compute intensive jobs.

Alternatively, the chassis upon which the execution of compute intensive jobs are moved may be a subset of the plurality of blade server chassis having blade servers upon which the one or more compute intensive jobs are identified. In such cases, compute intensive jobs are consolidated upon fewer chassis reducing the overall number of fans needed to support the execution of those compute intensive jobs.

In the example of FIG. 5, moving (308), by the data center management module, the execution of the compute intensive jobs to one or more blade servers of chassis for compute intensive jobs includes moving (310) the compute intensive jobs to a chassis predetermined as designated for compute intensive jobs, and more particularly, moving (310) the compute intensive jobs to a chassis designated for compute intensive jobs according to the method of FIG. 5 includes selecting (312) a chassis in a designated location in the data center. Such a predetermined location in the data center may include additional cooling such as increased air conditioning, increased fans and so on as will occur to those of skill in the art.

Thermal-based job scheduling among server chassis of a data center according to embodiments of the present invention are discussed in this specification to with reference to blade servers and blade server chassis. This is for explanation and not for limitation. In fact, servers may be implemented in many form factors and all such servers may be used in thermal-based job scheduling among server chassis of a data center according to embodiments of the present invention.

Exemplary embodiments of the present invention are described largely in the context of a fully functional computer system for thermal-based job scheduling among server chassis of a data center. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of thermal-based job scheduling among a plurality of server chassis of a data center, wherein each of the plurality of server chassis has servers upon which one or more compute intensive jobs are executing, the method comprising:

identifying, by a data center management module, one or more of the plurality of server chassis having a current fan speed that exceeds a predetermined threshold fan speed, wherein the data center management module comprising a module of automated computing machinery;

identifying, by the data center management module, the one or more compute intensive jobs currently executing on the identified one or more server chassis by identifying jobs on the identified server chassis which are consuming greater than a threshold value for a resource; and moving, by the data center management module, the execution of the identified compute intensive jobs to one of the plurality of server chassis in a location in the data center specifically designated as for executing compute intensive jobs.

2. The method of claim 1 wherein moving, by the data center management module, the execution of the identified compute intensive jobs to one of the plurality of servers of chassis for executing compute intensive jobs further comprises moving the identified compute intensive jobs to a server chassis predetermined as designated for compute intensive jobs.

3. The method of claim 1 wherein the server chassis to which the execution of compute intensive jobs are moved is a different server chassis than the identified one or more server chassis having servers upon which the one or more compute intensive jobs are identified.

4. The method of claim 1 wherein the server chassis to which the execution of compute intensive jobs are moved belongs to a subset of the identified one or more server chassis having servers upon which the one or more compute intensive jobs are identified.

5. The method of claim 1 wherein identifying a the one or more compute intensive jobs further comprises identifying jobs on the identified server chassis which are predetermined to be compute intensive.

6. An apparatus for thermal-based job scheduling among a plurality of server chassis of a data center, wherein each of the plurality of server chassis has servers upon which one or more compute intensive jobs are executing, the apparatus comprising a computer processor, a computer memory operatively coupled to the computer processor, the computer memory storing computer program instructions for:

identifying, by a data center management module, one or more of the plurality of server chassis having a current fan speed that exceeds a predetermined threshold fan speed, wherein the data center management module comprising a module of automated computing machinery;

identifying, by the data center management module, the one or more compute intensive jobs currently executing on the identified one or more server chassis by identifying jobs on the identified server chassis which are consuming greater than a threshold value for a resource; and moving, by the data center management module, the execution of the identified compute intensive jobs to one of the plurality of server chassis in a location in the data center specifically designated as for executing compute intensive jobs.

7. The apparatus of claim 6 wherein computer program instructions for moving, by the data center management module, the execution of the identified compute intensive jobs to one of the plurality of server chassis for executing compute intensive jobs further comprise computer program instructions for moving the identified compute intensive jobs to a server chassis predetermined as designated for compute intensive jobs.

8. The apparatus of claim 6 wherein the server chassis to which the execution of compute intensive jobs are moved is a different server chassis than the identified one or more server chassis having servers upon which the one or more compute intensive jobs are identified.

9. The apparatus of claim 6 wherein the server chassis to which the execution of compute intensive jobs are moved belongs to a subset of the one or more server chassis having servers upon which the one or more compute intensive jobs are identified.

10. The apparatus of claim 6 wherein computer program instructions for identifying the one or more compute intensive jobs further comprise computer program instructions for identifying jobs on the identified server chassis which are predetermined to be compute intensive.

11. A computer program product for thermal-based job scheduling among server chassis of a data center, wherein each of the plurality of server chassis has servers upon which one or more compute intensive jobs are executing, and wherein the computer program product is stored in a non-transitory computer readable storage medium, and comprises computer program instructions for:

identifying, by a data center management module, one or more of the plurality of server chassis having a current fan speed that exceeds a predetermined threshold fan speed, wherein the data center management module comprising a module of automated computing machinery;

identifying, by the data center management module, the one or more compute intensive jobs currently executing on the identified one or more server chassis by identifying jobs on the identified server chassis which are consuming greater than a threshold value for a resource; and moving, by the data center management module, the execution of the identified compute intensive jobs to one of the plurality of server chassis in a location in the data center specifically designated as for executing compute intensive jobs.

12. The computer program product of claim 11 wherein computer program instructions for moving, by the data center management module, the execution of the identified compute intensive jobs to one of the plurality of server chassis for executing compute intensive jobs further comprise computer program instructions for moving the identified compute intensive jobs to a server chassis predetermined as designated for compute intensive jobs.

13. The computer program product of claim 11 wherein the server chassis to which the execution of compute intensive jobs are moved belongs to a subset of the identified one or more server chassis having servers upon which the one or more compute intensive jobs are identified.

14. The computer program product of claim 11 wherein computer program instructions for identifying the one or more of compute intensive jobs further comprise computer program instructions for identifying jobs on the identified server chassis predetermined to be compute intensive.

* * * * *